United States Patent [19]

Tye

[11] 4,308,015

[45] Dec. 29, 1981

[54] SYSTEM AND METHOD FOR AIRCRAFT GUNNERY TRAINING AND ACCURACY EVALUATION

[75] Inventor: Gene Tye, Endwell, N.Y.

[73] Assignee: General Electric Company, Binghamton, N.Y.

[21] Appl. No.: 105,606

[22] Filed: Dec. 20, 1979

[51] Int. Cl.³ .............................................. F41G 3/26
[52] U.S. Cl. ..................................................... 434/14
[58] Field of Search ...................... 434/14, 20; 33/239; 235/404; 340/709, 734; 356/29, 251, 252

[56] References Cited

U.S. PATENT DOCUMENTS

| | | | |
|---|---|---|---|
| 2,467,831 | 4/1949 | Johnson | 356/252 X |
| 2,843,028 | 7/1958 | Ward et al. | 434/14 X |
| 2,957,245 | 10/1960 | Kimble | 356/252 X |
| 2,957,384 | 10/1960 | Raninen | 356/252 |
| 2,979,711 | 4/1961 | Shelley | 356/252 X |
| 3,024,536 | 3/1962 | Kuhlenkamp | 356/252 X |
| 3,137,769 | 6/1964 | Yates et al. | 356/251 X |
| 3,671,100 | 6/1972 | Bushman et al. | 434/14 X |

OTHER PUBLICATIONS

"New Gunsight Concept Evaluated", by Barry Miller, *Aviation Week and Space Technology*, Aug. 17, 1970, pp. 40, 41, 43, 44.

Primary Examiner—William H. Grieb
Attorney, Agent, or Firm—Arthur E. Bahr; Irving M. Freedman; Ralph M. Savage

[57] ABSTRACT

A system for aircraft gunnery training and accuracy evaluation wherein a head-up display unit employs a cathode ray tube for projecting simulated bullets on a pilot's sighting panel. The simulated bullets each comprise a pair of bullet trajectory indicia simulating the firing of the guns of the aircraft at an actual target. The indicia in a pair of bullet trajectory indicia are equidistantly spaced from the simulated trajectory path by an amount related to a selected dimension of the target. Each pair of bullet trajectory indicia are initially displayed to reflect the physical conditions of the aircraft at the time of firing, including the rates of aircraft roll, pitch and yaw, the aircraft lift acceleration, true aircraft airspeed, gun angle of attack, and relative air density. As the bullet trajectory indicia traverse the simulated trajectory path, the separation between the indicia comprising a pair of indicia is decreased to simulate increasing distance from the firing aircraft. A hit of a target occurs when a pair of bullet trajectory indicia are observed to overlie the target and the indicia in the pair are separated by a distance equal to the selected target dimension.

19 Claims, 9 Drawing Figures

| T(K) B12 | DRANG B12 | DVBV B12 | DVBVI B12 | DVBW B12 | RVDOT B12 | RVDOTI B12 |
|---|---|---|---|---|---|---|
| 03205 | 03485 | 03525 | 035C5 | 03665 | 03B65 | 03C05 |
| 03295 | 03515 | 035B5 | 03655 | 036F5 | 03BF5 | 03C95 |

| RWDOT B14 | RWDOTI B14 |
|---|---|
| 03D45 | 03DE5 |
| 03D05 | 03E75 |

| AB B12 | VB B13 | DVB B13 | VBW B12 |
|---|---|---|---|
| 032A5 | 03345 | 033E5 | 03705 |
| 03335 | 033D5 | 03475 | 03795 |

| RVV B12 | | RVVI B12 | | RWW B12 | |
|---|---|---|---|---|---|
| 037A5 | 037B5 | 038E5 | 038F5 | 03A25 | 03A35 |
| 037C5 | | | | | |
| 037E5 | | | | | |
| 03805 | | | | | |
| 03825 | | | | | |
| 03845 | | | | | |
| 03865 | | | | | |
| 03885 | | | | | |
| 038A5 | | | | | |
| 038C5 | 038D5 | 03A05 | 03A15 | 03B45 | 03B55 |

DOUBLE PRECISION     DOUBLE PRECISION     DOUBLE PRECISION

*FIG. 7*

|  | $\lambda V$ | $\lambda W_1$ |  | $\lambda V$ | $\lambda W_2$ |  |
|---|---|---|---|---|---|---|
| BULLET 1 | POS X | POS Y | JMP5 | POS X | POS Y | JMP5 |
| BULLET 2 | POS X | POS Y | JMP5 | POS X | POS Y | JMP5 |
| BULLET 3 | JMP6 |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
| BULLET 10 | JMP6 |  |  |  |  |  |

*FIG. 8*

SYSTEM AND METHOD FOR AIRCRAFT GUNNERY TRAINING AND ACCURACY EVALUATION

BACKGROUND OF THE INVENTION

One of the most serious limitations in the training of fighter pilots for proficiency in air-to-air gunnery has been the lack of realistic practice targets and of devices for reliably scoring the targets that have been used.

Common practice targets currently in use include darts, banners, Figats (fiberglass aerial targets), and drones. The first three of these targets are towed and, therefore, are restricted in their maneuverability. They are also much smaller than typical aircraft targets which makes long-range gunnery particularly difficult to practice.

These limitations are overcome in large part through the use of drones, but this approach is prohibitively expensive for regular squadron training because of the high cost of expendables, e.g., drone targets and live ammunition. Also, the use of live ammunition and the generation of target debris creates a flight safety problem and restricts the airspace available for training because of the hazard presented by falling debris. Also, in the case of drones, expensive control systems are required and the drones, themselves, are capable of being used only once. When towed targets are used the cost is inflated by the need to provide tractor aircraft as well as additional pilots for the tractor aircraft.

In addition to the cost and safety problems, there has been no satisfactory method for measuring missed distance when scoring the results of a practice run. Only those rounds which actually make holes in the target can be reliably scored when using the prior art targets. Further, it is frequently difficult to determine with any accuracy what detailed control action by the pilot produced the practice results from merely correlating the hits and misses recorded on the gunsight videotape.

The most serious limitation, however, is the lack of realism in target maneuverability. Techniques developed for effective firing against small, non-maneuvering targets may be incorrect for effective firing against large, evasive targets encoutered in actual air combat.

There have been attempts in the prior art to "fire" simulated bullets against real, manned aircraft targets rather than firing real bullets against simulated aircraft targets. Such real-time systems, however, have required a capability for automatic angle and range tracking of the target in order to compute, for display in the cockpit, the number of hits per "fired" burst. Although such target tracking is desirable, there are many realistic, air-to-air gun firing situations when sufficient time is not available to achieve any type of angle and range tracker lockon even when this capability is available on the aircraft.

OBJECTS AND SUMMARY OF THE INVENTION

It is accordingly an object of the present invention to provide an improved aircraft gunnery training and evaluation system and method wherein actual aircraft are employed as targets.

A further object is to provide an improved aircraft gunnery training and evaluation system and method wherein the realism of air-to-air gunnery training is significantly increased to train pilots for actual air combat situations.

Another object is to provide an improved aircraft gunnery training and evaluation system and method which significantly reduces the cost of training air-to-air gunnery through the virtual elimination of tractor aircraft, tractor pilots, ammunition, and drone targets.

Yet another object is to provide an improved aircraft gunnery training and evaluation system and method that enables details of misses as well as hits to be observed and correlated with the gun sight display.

Still a further object is to provide an improved aircraft gunnery training and evaluation system and method with significantly enhanced safety because live ammunition is not used and the danger of striking target debris is obviated.

A further object is to provide an improved aircraft gunnery training and evaluation system and method wherein assessment of combat film will be more effective because missed distances can be observed and analyzed.

Additional objects and advantages of the invention will be set forth in part in the description which follows, and in part will be apparent from the description or may be learned by practice of the invention. The objects and advantages of the invention may be realized and obtained by means of the instrumentalities and combinations particularly pointed out in the appended claims.

To achieve the foregoing objects in accordance with the invention, as embodied and broadly described herein, a gunnery simulating system for use with an aircraft during gunfire training and accuracy evaluation comprises a sighting panel presenting a field of view, including a target, to a gun operator; a means for generating data signals describing the motion of the aircraft; a display means for presenting and for displaying simultated bullet indicia; a means controlled by the operator for simulating the firing of the guns of the aircraft at the target; and a means for controlling the operation of the display means to present the simulated bullet indicia responsive to the simulated firing of the guns of the aircraft and for displaying the simulated trajectory paths of each of the presented simulated bullet indicia in response to said data signals whereby the display of said trajectory paths of the simulated bullet indicia are indicative of the actual trajectory paths which would be followed by real bullets fired from the guns of the aircraft.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 7 shows the memory locations used by the computer in implementing the gunnery system and method.

FIG. 8 shows the bullet display memory used by the symbol generator 28 (FIG. 3) to control the display unit 30 (FIG. 3) to display the pairs of bullet trajectory indicia representing the simulated bullets.

DETAILED DESCRIPTION OF THE INVENTION

Figure 1:
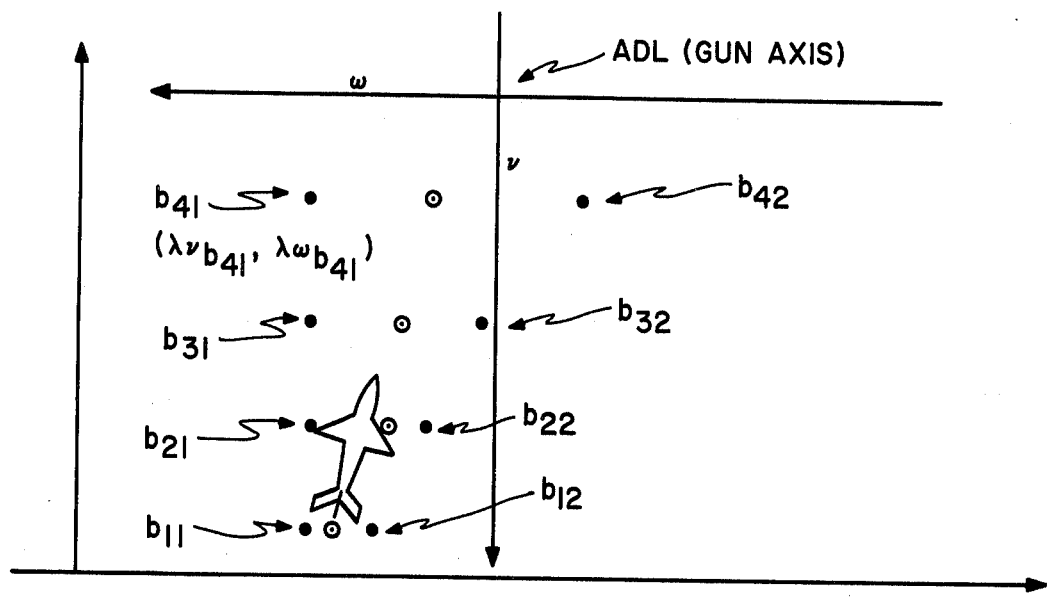
FIG. 1 is a schematic diagram illustrating the view, as seen by the pilot of the attacking aircraft, of the target aircraft and the trajectory path of bullet trajectory indicia representing simulated bullets fired at the target aircraft.

Referring now to FIG. 1, the present invention can be seen to employ the principle of firing simulated bullets at real targets. This is accomplished by projecting images or "pips" which track the trajectory of hypothetical bullets on the head-up display (HUD) used by the gun operator (pilot) of the attacking aircraft. This permits the pilot to observe the trajectory of the simulated bullets as the pips move toward the target in a manner essentially similar to the way tracer rounds are used in the instance of live ammunition.

Alternatively, the pips may be displayed only within the gun camera system and recorded for later use in evaluating pilot performance. This may be done by superimposing the pip display on the field of view of gun camera 72, which may or may not be positioned to record the actual field of view of the pilot.

In the present case, the displayed "pips" do not directly represent the bullets themselves, but rather two pips are projected for each bullet and the bullet position (which need not be actually displayed) is mid-way between the two pips. This principle is illustrated in FIG. 1 wherein pips ($b_{11}, b_{12}$,) are equidistant from the simulated trajectory path of the first simulated round fired after the pilot depresses the trigger. The position of the round itself (circled dot) is mid-way between the pips ($b_{11}, b_{12}$). Pips ($b_{21}, b_{22}$), ($b_{31}, b_{32}$) and ($b_{41}, b_{42}$) are equidistant from the simulated second, third, and fourth fired rounds, respectively.

The target T is shown with respect to the pairs of pips and the distance between a pair of pips is selected to be equal to a known dimension of the target, e.g., aircraft wingspan. The pips are displayed to appear to converge as the simulated round position moves further along its trajectory path from the gun muzzle. The point when the display round is at target range is determined by observing the lateral separation between the pip pair representing the round. When the distance between the pips is equal to the selected target dimension, the round is in the plane of the target.

This use of dual pips enables the pilot, or a person evaluating the pilots's performance through later review of videotape or film produced by camera 72, to determine the point at which the bullets pass through the plane of the target. Rounds which overlie the target image at this point are "hits." This simulated bullet display system, therefore, enables a more accurate and useful evaluation of a pilot's performance than the traditional use of live tracer rounds and simulated target techniques.

Figure 2:
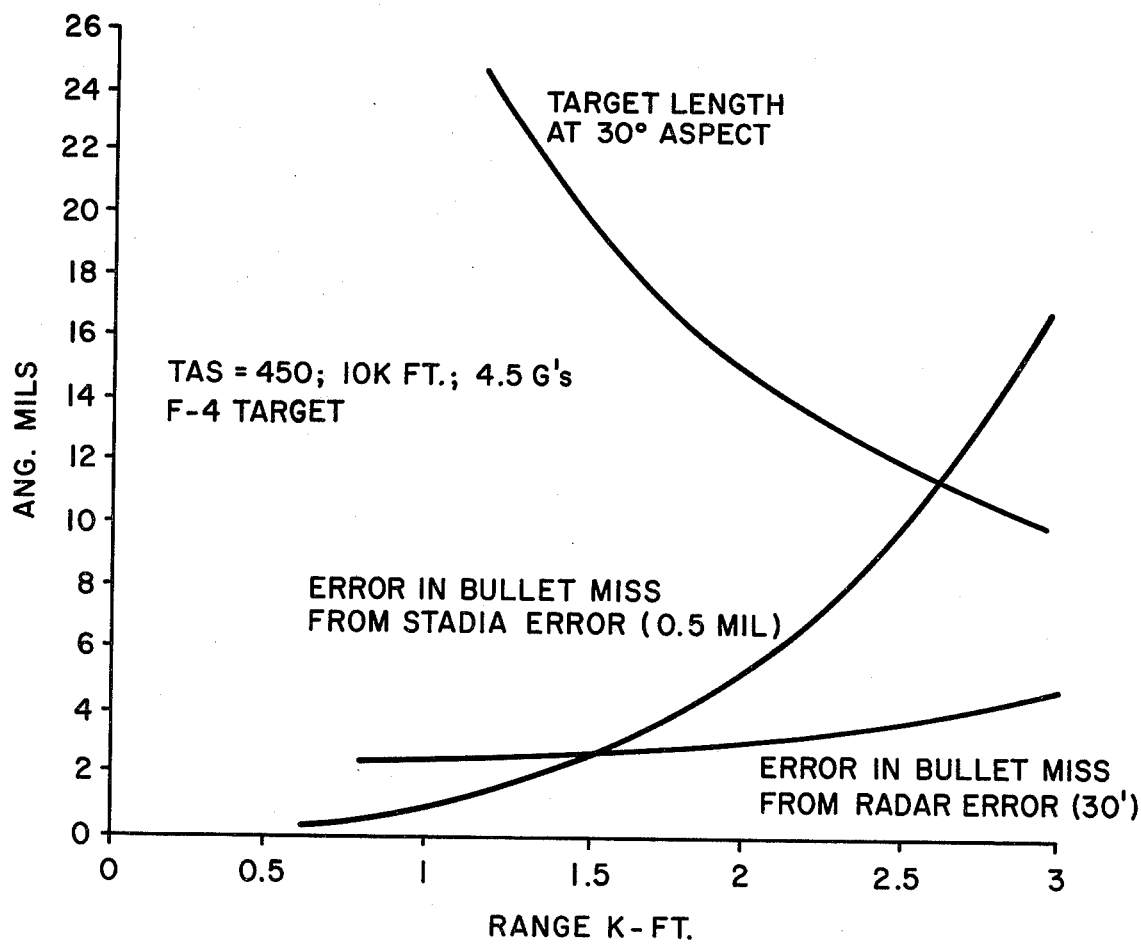
FIG. 2 graphically compares the accuracy of the stadia method of analysis to analysis when radar lock-on is employed.

The degree of accuracy with which target range can be measured by this system is limited primarily by the film resolution of the videotape since a "hit" is determined visually by the equality of pip spacing and selected target dimension. For most HUDs currently in operation, camera film resolution is about 0.5 milliradians (mr) under nominal lighting conditions. FIG. 2 illustrates a representative gunnery assessment error corresponding to a 0.5 mr film resolution. It is apparent that the stadia metric method is more accurate than a typical aircraft radar in computing target range for distances up to 1,500 feet. The uncertainty in bullet impact error is within typical target dimensions out to a range of about 2,500 feet.

If radar lock-on is achieved, the point in time when each simulated round passes through the target range can be determined in flight from known ballistic parameters and the motion characteristics of the aircraft at the time of firing. This point in time can be displayed directly to the pilot and recorded on the videotape or other film. The stadia method then can be used as a more accurate assessment of error in short ranges without radar lock-on, i.e., less than 1500 feet, and as a back-up assessment at longer ranges when the recorded data is being analyzed.

The evaluation display can be flight tested simply by reducing the target wingspan to zero and firing live tracers under conditions where they can be easily observed and photographed. There should be a one-to-one correspondence between the actual and simulated rounds as the aircraft is maneuvered while the rounds are in flight. In normal operating conditions, this also provides the pilot with an effective method for checking the boresight accuracy of the aircraft guns.

It is not critical that, for example, the correct target wingspan be set before the simulated firing provided that the value used, as well as the actual target wingspan, are known. This complicates the data reduction to a degree, but a useful result is nonetheless obtainable.

When the gunnery evaluation display is included in the same HUD used by the pilot for gun aiming, the pilot is provided with a sense of having fired a weapon at the target during a training exercise, and provides a useful degree of immediate feedback of results. If, however, it is determined that the pilot would be distracted by including the evaluation display in the normal gunsight, then the simulated rounds could be superimposed on the videotape produced by the gunsight TV camera.

Figure 3:
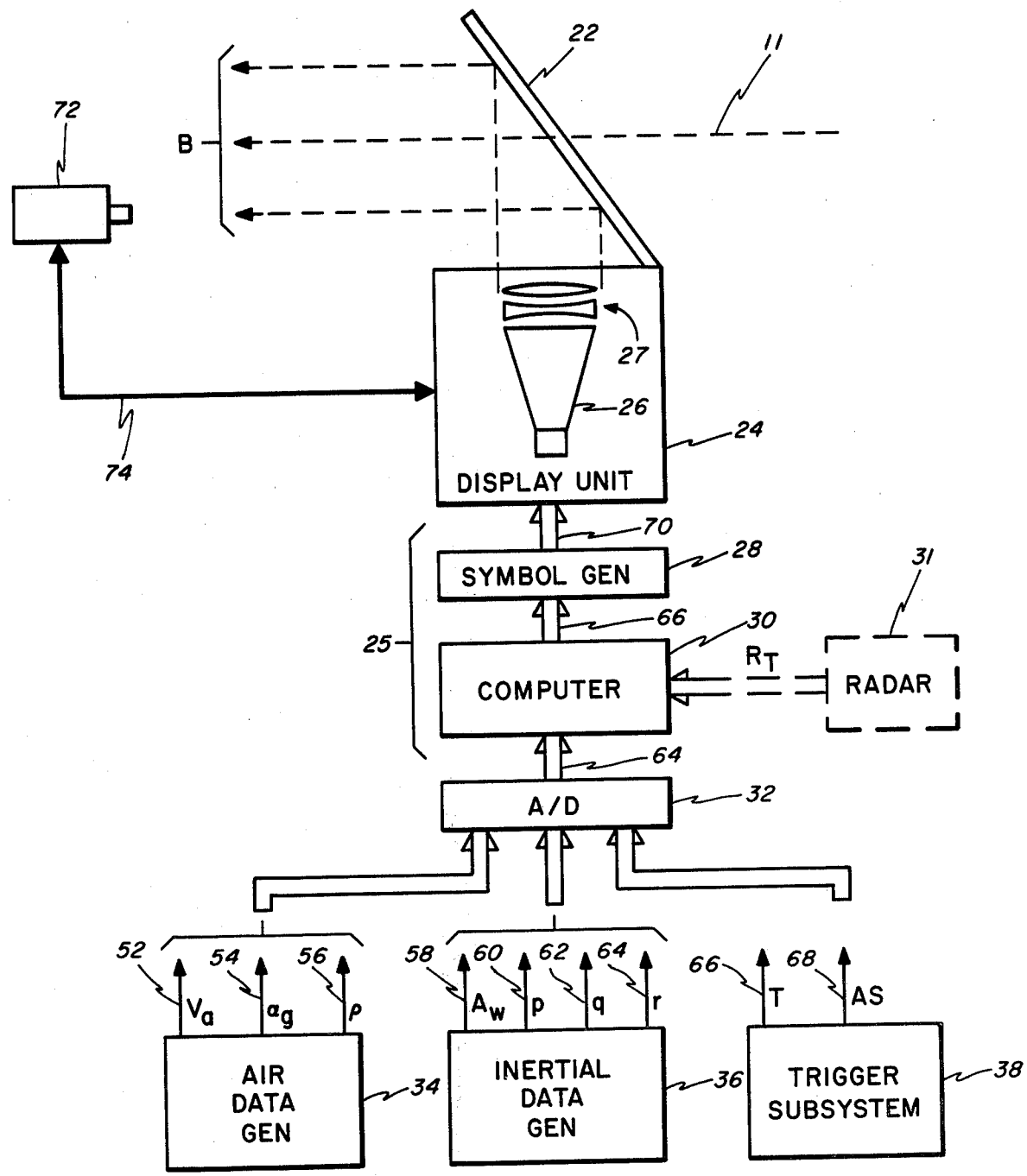
FIG. 3 is a block diagram showing the interrelation of the various components of the gunnery system in accordance with one embodiment of the invention.

FIG. 3 shows, in block diagram form, the gunsight system in accordance with a preferred embodiment of the invention. The pilot (gun operator), located at B, is presented with a field of view through a combining glass panel 22 arranged in accordance with a conventional HUD configuration. The pilot's field of view includes the line of sight 11 to the target.

As embodied herein, the display means for presenting and displaying simulated bullet pips or trajectory indicia comprises a sighting display unit 24, including a cathode ray tube (CRT) 26 and collimating optics 27, operating to project sighting indicia onto the pilot's field of view via the combining glass 22. The collimating optics 27 serve to focus the indicia images so that they appear to the pilot to be emanating from infinity, i.e., from the area of the target. This collimating arrangement is well-known in connection with HUD systems and operates to eliminate parallax problems and permits the pilot the freedom to move his head within the sight field of view without degrading the accuracy of the system.

As embodied herein, the display unit 24 projects bullet trajectory indicia or pips in accordance with control signals received from a controlling means 25 including a symbol generator 28 and a digital computer 30. The latter receives inputs through an analog-to-digital converter unit 32 from means for generating data signals describing the motion of the aircraft and including a plurality of data input sources 34, 36 and 38.

Air data generator 34 supplies signals to A/D unit 32 over lines 52, 54 and 56 representing, respectively, aircraft true air speed $V_a$, gun angle of attack $\alpha_g$, and relative air density $\rho/\rho_o$. These signals are encoded by A/D converter unit 32 and are fed to computer 30 via data bus 64.

An inertial data generator 36 supplies signals representing own aircraft lift acceleration $A_w$, roll rate p, pitch rate q, and yaw rate r, on lines 58, 60, 62 and 64, respectively. Thes signals are also encoded by A/D converter 32 and fed to computer 30 via data bus 64.

As herein embodied, a means controlled by the operator for simulating the firing of the aircraft gun comprises a trigger subsystem 38 which supplies signals T representing the actuation of the gun trigger by the pilot and AS corresponding to the identification of the type of the target. The signals T could be a single pulse indicating the firing of a single bullet or, more likely, a series of pulses corresponding to a series of bullets fired in a sequence at the target. These signals are supplied to A/D converter 32 and fed to computer 30 over data bus 64.

The digital computer, HUD, inertial and air data sensors appropriate for modern fighter aircraft are sufficient for mechanization of the display illustrated in FIG. 3. Typical sensor requirements are:

| | |
|---|---|
| TRUE AIR SPEED: | 100 to 1,000 fps ± 2% |
| ANGLE OF ATTACK: | 0 to 20° ± 1° |
| RELATIVE AIR DENSITY: | 0.2 to 1.1 ± 5% |
| NORMAL ACCELERATION: | −1 to 7 g's ± 0.1g |
| PITCH RATE: | −6° to +30°/sec, ± .05°/sec |
| YAW RATE: | ±20°/sec, ± .05°/sec |
| ROLL RATE: | ±200°/sec, ± .5°/sec |

A videotape camera 72 is positioned to record the view of the pilot through his sighting panel 22. Thus, the target and approaching stream of bullet trajectory indicia or pips can be recorded on videotape for later analysis and evaluation.

In order to determine whether the simulated bullets are being accurately aimed so that the target aircraft would be hit, it is necessary to compute the trajectory of the simulated bullets. This computation must take into account the velocity and direction of the aircraft at the time of firing a simulated bullet, the muzzle velocity of the bullet, the effects of gravity on bullet trajectory, air density and other factors.

Figure 4:
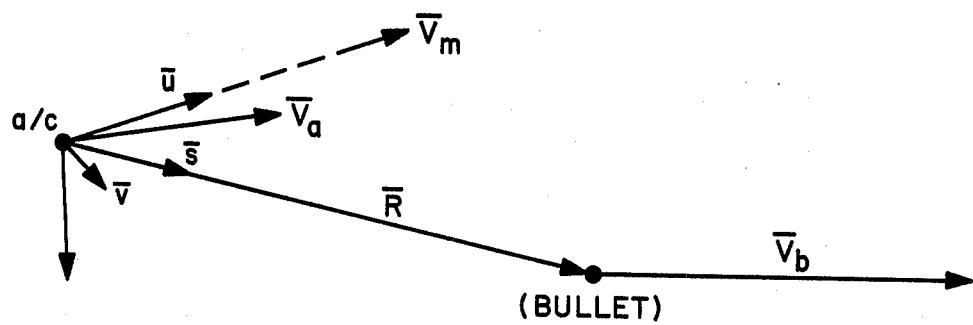
FIG. 4 is a vector diagram useful in understanding the development of the mathematical theory underlying the design and operation of the gunnery system.

FIG. 4 geometrically represents the components of the range vector $\overline{R}$ and bullet velocity vector $\overline{V}_b$ which describes the trajectory of the bullet at any point in time after firing. The position of the aircraft is indicated by the point of origin a/c and the components $\overline{u}$, $\overline{v}$ and $\overline{w}$ represent unit vectors along the axes of the three spatial dimensions relative to the point of origin a/c. Unit vector v is along the right wing of the aircraft, unit vector u is along the gun bore axis and unit vector $\overline{w}$ is in a direction normal to the wings and, by convention, downward. The unit vector $\overline{s}$ is along the line of sight to the target. The vector $\overline{V}_m$ is the scalar muzzle velocity (speed) of the bullet multiplied by the vector $\overline{u}$. The true airspeed of the aircraft is defined by the vector $\overline{V}_a$.

There are many ways for computing the vectors $\overline{V}_b$ and $\overline{R}$ and one particularly suited for use with a digital computer is closed loop integration wherein first order integration of the differential equations describing the forces actuating upon the bullets is made sufficiently accurate by including small corrections for the error that otherwise results.

The scalar distance traveled by a bullet $R_b$ in an air mass at a given time and after firing is given by $$R_b(t) = \frac{(V_a + V_m)t}{1 + \omega_o t} \qquad (1)$$

where $$\omega_o = k_o \rho/\rho_o \left(1 + \frac{V_a}{2V_m}\right)$$

and $k_o$ = ballistic coefficient $\cong 0.00625\sqrt{V_m} = 0.36$ rad/sec.
$\rho/\rho_o$ = relative air density: 0.2 to 1.1

Except for the effect of gravity, which will be added later, the direction of $R_b$ is precisely along the direction of the initial bullet velocity, $$\overline{V}_b(o) = \overline{V}_a = \overline{V}_m \qquad (2)$$

Thus, $$\overline{R}_b(t) = \frac{\overline{V}_{bo} t}{1 + \omega_o t} . \qquad (3)$$

It is necessary that $V_b(o)$ be observed in the aircraft coordinate frame, $\overline{u}$, $\overline{v}$, $\overline{w}$. Since $V_{bo}$ is constant in inertial coordinates, the acceleration of the bullet at time $t=0$ is $$\dot{\overline{V}}_{bo} \text{ (inertial)} = \dot{\overline{V}}_{bo(u\,v\,w)} + \overline{\omega} \times \overline{V}_{bo} = 0 \qquad (4)$$

where $$\overline{\omega} = p\overline{u} + q\overline{v} + r\overline{w}$$

and p, q and r are the previously described roll, pitch and yaw rates determined by the inertial data generator 36 (FIG. 3).

Thus, $$\begin{aligned}
&V_{bo}(u\,v\,w) = -X\, V_{bo} \\
&V_b(o)_u = V_a + V_m \\
&V_b(o)_v = V_a \sin \beta_o \cong V_a \beta_o \\
&V_b(o)_w = V_a \sin \alpha_o \cong V_a \alpha_o \\
&\alpha_o = \text{gun angle of attack at } t = o \text{ (time of firing)} \\
&\beta_o = \text{angle of side slip at } t = o \\
&\overline{\omega} = \text{angular rate of } \overline{u}\,\overline{v}\,\overline{w}.
\end{aligned} \qquad (5)$$

Therefore, $$\overline{\omega} \times \overline{V}_{bo} = \overline{u}\left[\omega_v V_{bo_w} - \omega_w V_{bo_v}\right] \qquad (6)$$

$$-\overline{v}\left[\omega_u V_{bo_w} - \omega_w V_{bo_u}\right] + \overline{w}\left[\omega_u V_{bo_v} - \omega_v V_{bo_u}\right]$$

The components of bullet initial velocity as observed in $\overline{u}$, $\overline{v}$, $\overline{w}$ are then, $$\dot{V}_{bo_u} = -\omega_v V_{bo_w} + \omega_w V_{bo_v}; \quad V_b(o)_u = V_a + V_m \quad (7)$$

$$\dot{V}_{bo_v} = \omega_u V_{bo_w} - \omega_w V_{bo_u}; \quad V_b(o)_v = V_a \beta_o \quad (8)$$

$$\dot{V}_{bo_w} = \omega_v V_{bo_u} - \omega_u V_{bo_v}; \quad V_b(o)_w = V_a \alpha_o \quad (9)$$

If displacement of own aircraft from the point of firing is $R_a$, then the distance vector to the round is $$\overline{R}_{ab} = \overline{R}_b - \overline{R}_a \quad (10)$$

It is also necessary that $R_a$ be determined in u v w coordinates.

$$\dot{\overline{R}}_a \text{ (inertial)} = V_a = R_{a(u\,v\,w)} + \omega \times R_a \quad (11)$$

$$\dot{R}_{a(\overline{u}\,\overline{v}\,\overline{w})} = \overline{V}_a - \overline{\omega} \times \overline{R}_a \quad (12)$$

$$\overline{V}_a = V_a \overline{u} + \beta V_a \overline{v} + \alpha V_a \overline{w} \quad (13)$$

$$\overline{\omega} \times \overline{R}_a = \overline{u}\left[\omega_v R_{aw} - \omega_w R_{av}\right] - \overline{v}\left[\omega_u R_{aw} - \omega_w R_{au}\right] \quad (14)$$

$$+ \overline{w}\left[\omega_u R_{av} - \omega_v R_{au}\right]$$

Thus, $$\dot{R}_{au} = V_a + \omega_w R_{av} - \omega_v R_{aw} \quad (15)$$

$$\dot{R}_{av} = \beta V_a + \omega_u R_{aw} - \omega_w R_{au} \quad (16)$$

$$\dot{R}_{aw} = \alpha V_a + \omega_v R_{au} - \omega_u R_{av} \quad (17)$$

Total gravity drop of the bullet, including the effects of aero drag, is readily shown for the 3/2 power drag law to be of the form $$\overline{G} = \frac{1}{6} g\, t^2 \left[1 + \frac{2}{1 + \omega_o t}\right] \quad (18)$$

$$\omega_o = k_o \rho/\rho_o \left(1 + \frac{V_a}{2V_m}\right)$$

Elevation and traverse components of (18) are, respectively $$G_w = \frac{1}{6} g\, t^2 \left[1 + \frac{2}{1 + \omega_o t}\right] \cos\theta \cos\phi \quad (19)$$

$$G_v = \frac{1}{6} g\, t^2 \left[1 + \frac{2}{1 + \omega_o t}\right] \cos\theta \sin\phi \quad (20)$$

where
$\theta$ = aircraft pitch attitude
and $\phi$ = aircraft roll attitude

The elevation and traverse coordinate angles to be displayed for the pair of pips simulating a bullet are, respectively $$\lambda_v = -\tan^{-1}\left[\frac{R_{bw} + G_w + Z_p - R_{aw}}{R_{ab_u}}\right] \quad (21)$$

$$\lambda_{w1} = \tan^{-1}\left[\frac{R_{bv} + G_v - R_{av} + W/2}{R_{ab_u}}\right] \quad (22)$$

$$\lambda_{w2} = \tan^{-1}\left[\frac{R_{bv} + G_v - R_{av} - W/2}{R_{ab_u}}\right] \quad (23)$$

Where:
$Z_p$ = [Gun/sight parallax] and $0 \leq Z_p \leq 20$ ft.
$W$ = target wing span These expressions for $\lambda_v$, $\lambda_{w1}$ and $\lambda_{w2}$ can be simplified by replacing certain terms in their derivations with suitable approximations. In particular, the second and third terms on the right of equations (15) can be neglected for most all air-to-air gunnery situations of interest. Maximum error resulting from this approximation is estimated by evaluating the term $\omega_v R_{aw}$.

$$R_{aw} \cong \alpha V_a t + \omega_v \frac{V_a t^2}{2} \quad (24)$$

$$\epsilon \cong \int_o^{T_f} \omega_v R_{aw} dt \cong \frac{\omega_v V_a T_f^2}{2}\left[\alpha + \frac{\omega_v T_f}{3}\right] \quad (25)$$

For $\omega_v = .25$ rad/sec $V_a = 800$ fps $T_f = 1$ sec.

$\alpha = 0.2$ rad, $$\epsilon \cong \frac{(.25)(800)}{2}[.2 + .08] = 14 \text{ ft.} \quad (26)$$

This is a negligible error in range. A similar approximation in equation (7) is inappropriate because the corresponding range error would be almost an order of magnitude larger than (23).

A potentially significant source of error, however, can result from the finite solution rate. An estimate of this error can be obtained from analysis of equations (8) and (9). Elevation angular error resulting from rectangular integration during each interval is approximately $$= \frac{\ddot{V}_{bo_w}}{V_{bo_u}} \frac{\Delta t^2}{2} \quad (27)$$

Total elevation angular error at a particular time of flight is $$\epsilon_1 = \sum_{i=0}^{n} \frac{\ddot{V}_{bo_w(i)}}{V_{bo_u(i)}} \frac{\Delta t^2}{2} \quad (28)$$

From (9)

$$\ddot{V}_{bo_w} \cong \dot{\omega}_v V_{bo_u} + \omega_v \dot{V}_{bo_u} \cong \dot{\omega}_v (V_a + V_m) \quad (29)$$

$$V_{bo_u} \cong V_a + V_m$$

Thus $$\frac{\ddot{V}_{bo_w}}{V_{bo_u}} \cong \dot{\omega}_v \tag{30}$$

$$\epsilon_1 = \sum_{i=0}^{n} \dot{\omega}_v(i) \frac{\Delta t^2}{2} = \sum_{i=0}^{n} \dot{\omega}_v(i)[\Delta t]\left[\frac{\Delta t}{2}\right]$$

$$\epsilon_1 \cong \omega_v \frac{\Delta t}{2} \tag{31}$$

A representative value is $$\epsilon_1 = (250 \, mr/sec)\left(\frac{.02 \, sec}{2}\right) = 2.5 \, mr \tag{32}$$

Although this error is small, it is not entirely negligible. Because it is small, however, it can be corrected by simply adding the estimated error (31) to the final computation of elevation angle.

Traverse error is estimated from equation (8).

$$\dot{V}_{bo_v} = \omega_u V_{bo_w} - \omega_w V_{bo_u} \tag{33}$$

It is sufficiently accurate for error analysis to assume coordinated flight, i.e., $$\omega_w \cong \alpha \omega_u \tag{34}$$

If rudder pedals are used to any significant degree to generate side slip, the analysis of the second term $$(wV_{bo_u})$$

would proceed exactly as done in the development of (31). Since $\omega_w$ in this case would be about 100 mr/sec at most, the corresponding error due to first order integration would be about one mr (negligible). Thus $$\dot{V}_{bo_v} \cong \omega_u(V_{bo_w} - \alpha V_{bo_u}) \tag{35}$$

However, $V_{bo_w} = \alpha V_{bo_u} + \int \dot{V}_{bo_w} dt \tag{36}$

From (9), $$\dot{V}_{bo_w} \cong \omega_v V_{bo_u}$$

and $$\int \dot{V}_{bo_w} dt \cong \Delta V_{bo_w} \tag{37}$$

Therefore $$\ddot{V}_{bo_v} = \frac{d}{dt}(\omega_u \Delta V_{bo_w}) \tag{38}$$

Error due to first order integration is $$V_{bo_u}\epsilon_2 \cong \sum_{i=0}^{n} \ddot{V}_{bo_v}^{(i)} \frac{\Delta t^2}{2} \tag{39}$$

$$\cong \frac{\Delta t}{2} \int_0^{tf} \ddot{V}_{bo_v} dt \tag{40}$$

$$\cong \frac{\Delta t}{2} \omega_u \Delta V_{bo_w} \tag{41}$$

Thus $$\epsilon_2 \cong \frac{\Delta t}{2} \omega_u \frac{\Delta V_{bo_w}}{V_{bo_u}} \cong -\frac{\Delta t}{2} \omega_u \lambda_v \tag{42}$$

Representative (max) numbers are
$\omega_w = 2$ rad/sec
$\lambda_v = -250$ mr.
$\Delta t = 0.02$ sec.
$\epsilon_2 = 5$ mr.

This is not a negligible error, particularly since it is a lateral error. Equation (42) is therefore an appropriate correction to be added to the traverse bullet angle. Traverse angles (22) and (23) may be approximated by the argument of the arc tan function with sufficient accuracy.

$$\tan^{-1}\chi = \chi - \frac{\chi^3}{3} + \tag{43}$$

Table 1 lists the error $X^3/3$ in approximating $\tan^{-1}X$ with X

TABLE 1

| $\chi$ (mr.) | $\epsilon = \left(\frac{X^3}{3}\right)$ $(10^{-9})$ (mr) |
|---|---|
| 100 | .33 |
| 150 | 1.1 |
| 200 | 2.9 |
| 250 | 5.0 |

The third order term is apparently necessary for elevation angles but not for transverse angles.

The foregoing equations for deriving the angular display coordinates, $\lambda_v$, $\lambda_{w1}$, and $\lambda_{w2}$ for each pair of pips corresponding to a fired simulated bullet can be grouped and summarized as follows:

1. Aero Drag $$\omega_o = K_o \rho/\rho_o \left(1 + \frac{V_a}{2V_m}\right)$$

$$a = \frac{1}{1 + \omega_o \, tf}$$

$$T = a \, tf$$

2. Initial Bullet Velocity as Observed in Aircraft (u v w) Coordinates $$\dot{V}_{bo_u} = -\omega_v V_{bo_w} + \omega_w V_{bo_v}; \quad V_{bo_u}^{(o)} = V_a + V_m$$

$$\dot{V}_{bo_v} = \omega_u V_{bo_w} - \omega_w V_{bo_u}; \quad V_{bo_v}^{(o)} = V_a \beta(o)$$

$$\dot{V}_{bo_w} = \omega_v V_{bo_u} - \omega_u V_{bo_v}; \quad V_{bo_w}^{(o)} = V_a \alpha(o)$$

3. Bullet Range Relative to Firing Point $$R_{bu} = \tau V_{bo_u}$$
$$R_{bv} = \tau V_{bo_u}$$
$$R_{bw} = \tau V_{bo_w}$$

4. Aircraft Range Relative to Firing Point $$\dot{R}_{au} = V_a \, tf$$
$$\dot{R}_{av} = \beta V_a + \omega_u R_{aw} - \omega_v R_{au}$$

-continued
$$R_{aw} = \alpha V_a + \omega_v R_{au} - \omega_u R_{av}$$

5. Gravity Drop $$G = \frac{g\, t_f^2}{6}(1 + 2a)$$
$$G_v = G \cos\theta \sin\phi$$
$$G_w = G \cos\theta \cos\phi$$

6. Bullet Range Relative to Aircraft $$R_{ab_u} = R_{bu} - R_{au}$$
$$R_{ab_v} = R_{bv} - R_{av}$$
$$R_{ab_w} = R_{bw} - R_{aw}$$

7. Sight Angles $$y = -\frac{R_{ab_w} + G_w + Z_p}{R_{ab_u}}$$
$$\chi_1 = \frac{R_{ab_v} + G_v + W/2}{R_{ab_u}}$$
$$\chi_2 = \frac{R_{ab_w} + G_v - W/2}{R_{ab_u}}$$
$$\lambda_v = y - \frac{y^3}{3} + \omega_v \frac{\Delta t}{2}$$
$$\lambda_{w1} = \chi_1 - \omega_u \lambda_v \frac{\Delta t}{2}$$
$$\lambda_{w2} = \chi_2 - \omega_u \lambda_v \frac{\Delta t}{2}$$

Although the above-discussed equations enable the gunnery firing and evaluation system and method to provide meaningful results in practice of air gunnery, significant additional capability is available when the aircraft's radar is employed to effect range lock-on. With this capability, it is possible to display the rounds or pairs of pips at target range directly, although the instantaneous positions of the pairs of pips would still be displayed. Some advantages of this approach are:

1. A direct display of bullet miss distance greatly simplifies data reduction.
2. The pilot is provided an immediate in-flight assessment of firing effectiveness.
3. A more accurate measure of miss distance at long range is available.
4. Redundancy in the measurement of bullet miss distance provides additional accuracy or greater assurance that some useful information will always be obtained.

The angular position of the bullet at target range is displayed in the form of a six milliradian circle (dispersion) at the time that bullet range is equal to target range. A somewhat simpler, and sufficiently accurate approach is to compare the u axis component of bullet position with the u axis component of target range, i.e., $$R_{ab_u} > R_{Tu} \cong R_T\left(1 - \frac{\lambda_{t_v}^2 + \lambda_{t_w}^2}{2}\right) \tag{44}$$

Where:
$R_T$ = target range from radar
$\lambda t_v$ = Radar elevation gimbal angle (relative to ADL)
$\lambda t_w$ = Radar traverse gimbal angle Bullet angle would be displaced at the first iteration following inequality (44).

Because of the high angular rates characteristic of air-to-air gunnery, some interpolation between computer iterations will generally be required.

For an angular rate of 200 mr/sec, for example, a computer iteration time of 0.02 sec. produces a 4 mr step between successive bullet angles. This is not a negligible error, although it is small.

$$\text{Let } \Delta R_{bt} = R_{ab_u}(t_f) - R_T(t_f) \tag{45}$$
= u component of range from target to bullet on the first iteration after inequality (44) is satisfied.

The appropriate corrections to bullet range components before display are therefore $$R'_{ab_w}(t_f) = R_{ab_w}(t_f) - \Delta R_{ab_w}(t_f)\left(\frac{\Delta R_{bt}}{\Delta R_{ab_u}(t_f)}\right) \tag{46}$$

Where:

$\Delta R_{ab_w}(t_f)$ = Change in $R_{ab_w}$ during the interval that the bullet passes the target.
$\Delta R_{ab_u}(t_f)$ = Change in $\Delta R_{ab_u}$ during the interval that the bullet passes the target.

Because of the significantly lower yaw rates, interpolation for $R_{av}$ does not appear to be justifiable.

The elevation and traverse angular coordinates would then be calculated according to the equations summarized in (7) above.

Figure 5:
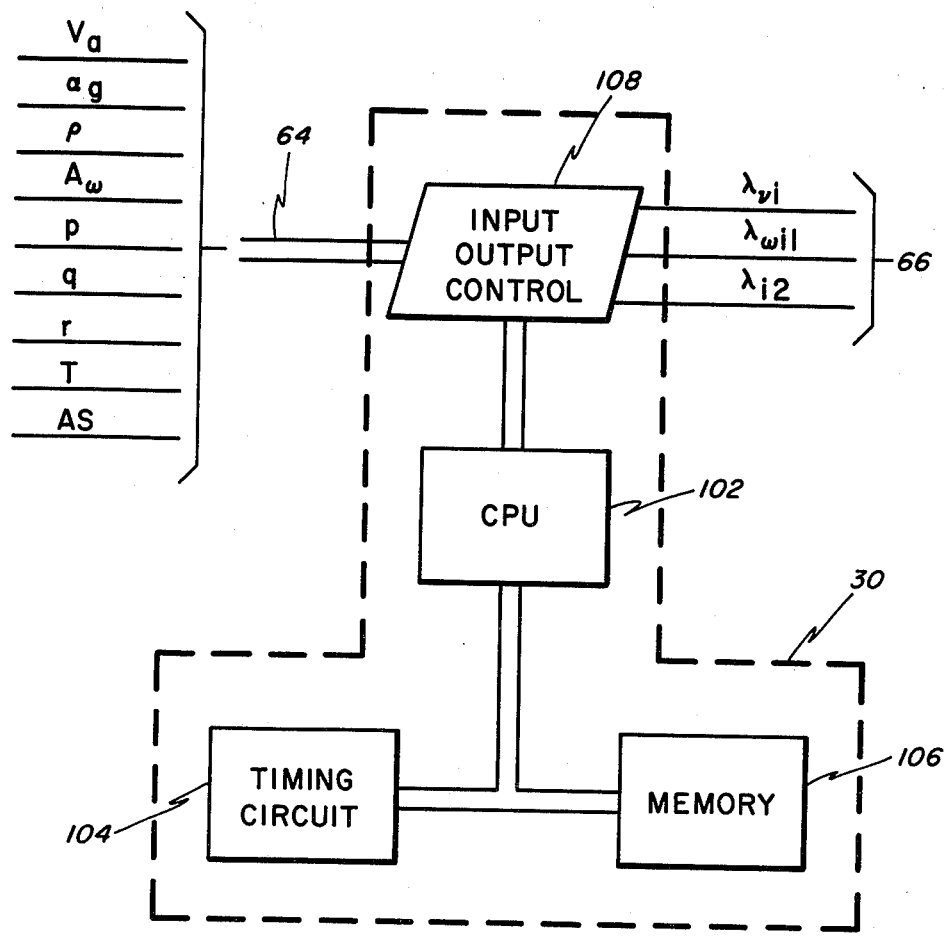
FIG. 5 is a block diagram illustrating further details of the computer 30 shown in FIG. 3.

FIG. 5 shows in more detail the computer 30 of FIG. 3. The computer 30 comprises a central processor unit 102 interconnected with a timing circuit 104 and a memory 106. The central processor unit 102 receives the outputs from air data generator 34, inertial data generator 36 and trigger subsystem 38 over bus 64 through input/output control 108. Similarly, the CPU 102 passes information from memory 106 to bus 66 and to symbol generator 28 through the input/output control 108. This information comprises the angular coordinates for the pairs of bullet trajectory indicia or pips displayed on the combining glass 22 by the sighting display unit 24. A suitable central processor unit is the MCP701A digital display processor manufactured by General Electric Co.

Figure 6A:
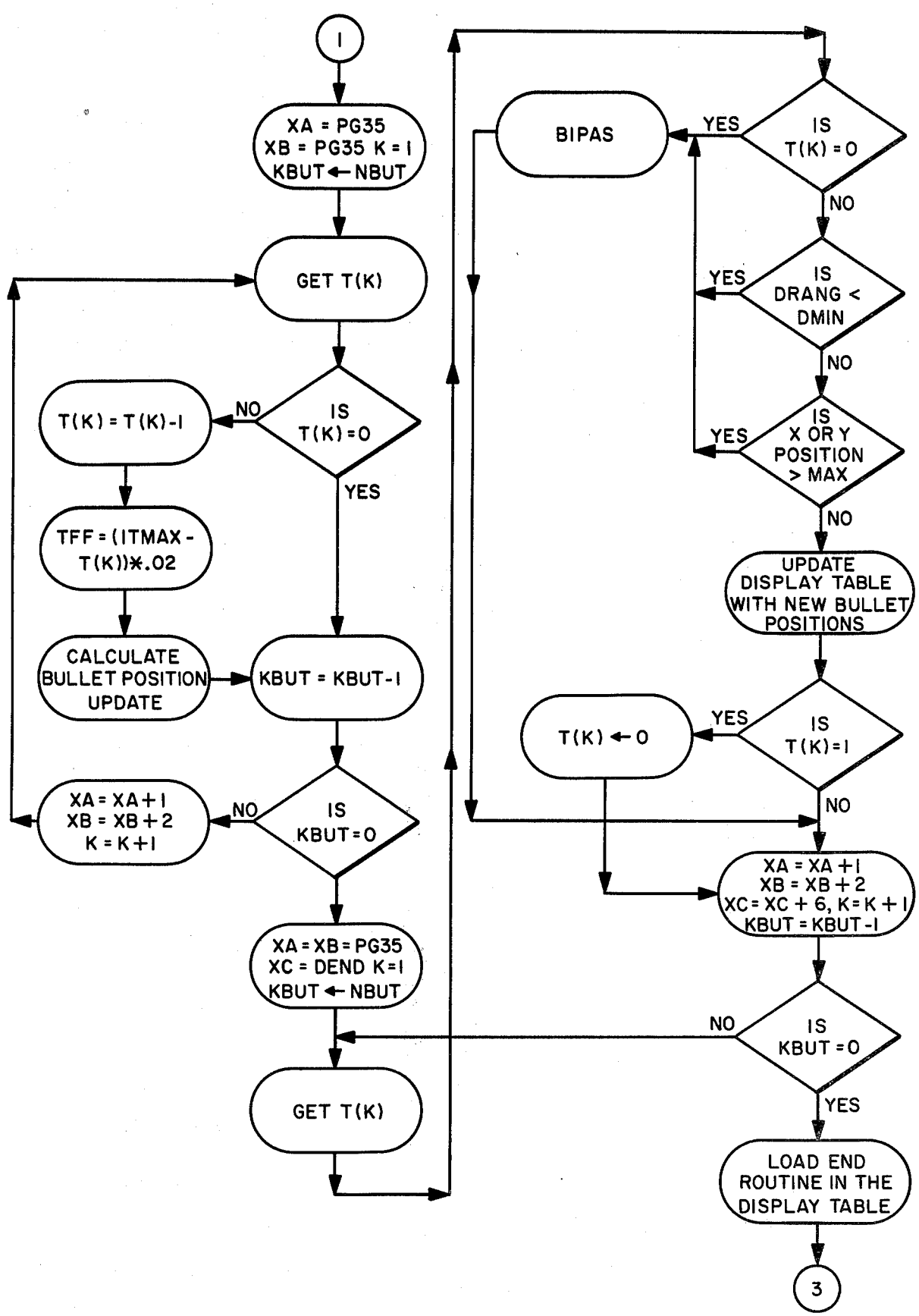
FIGS. 6A and 6B are flowcharts of the program used by computer 30 to implement the gunnery system and method.
Figure 6B:
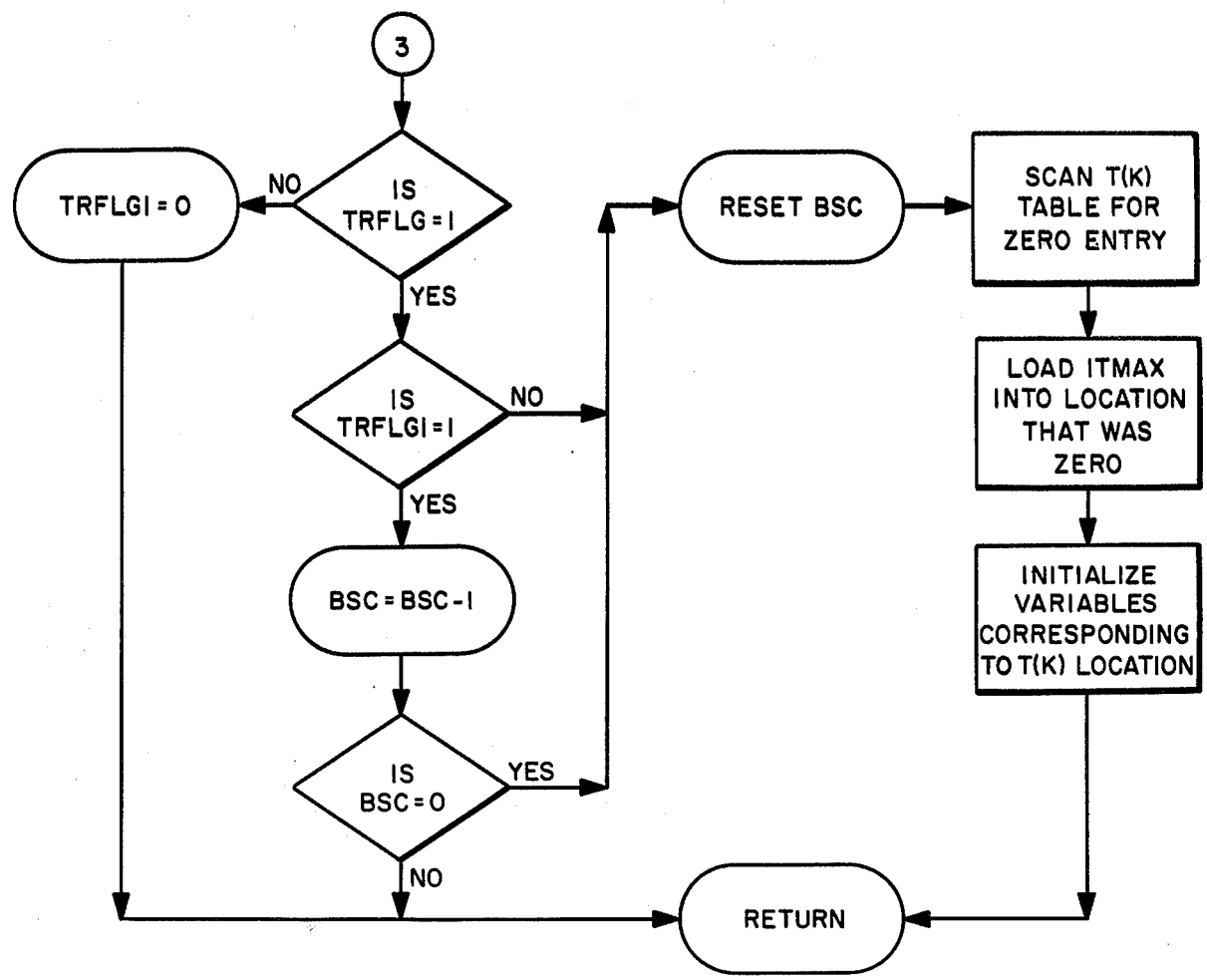

In the preferred embodiment, the angular coordinates of the pairs of pips are generated by central processor unit 102 by means of the above-discussed equations. In order to perform these calculations and generate the angular coordinates, the central processor 102 is programmed to perform the necessary operations. FIGS. 6a and 6b show the program for accomplishing this task.

FIG. 7 shows the data tables resident in memory 106 for storing the data necessary to perform the calculations.

FIG. 8 shows the display tables also resident in memory 106 for storing the angular coordinate of the pairs of pips.

The following is a list of mnemonics for the data quantitites used in calculating the angular coordinates:
XC—the C register in the MCP701A computer;
XA—the A register in the MCP701A computer;
XB—the B register in the MCP701A computer;

NBUT—number of simulated bullets displayable at the same time to represent a bullet stream 810 maximum);

KBUT—used as a pointer, initially equals NBUT and is decremented N times;

ITMAX—constant equal to 1+(the total time of flight)/(iteration rate);

TFF—time of flight for a simulated bullet;

PG35—starting address of page 3 scratch pad memory;

DEND—address of last location used in display table;

DRANG—calculated range from firing aircraft to simulated bullet;

DMIN—constant set to check the minimum range;

BIPAS—represents the routine to bypass displaying a simulated bullet if;

1. T(K)=0;
2. DRANG<DMIN; or
3. bullet is out of the field of view of HUD;

TRFLG—a discreet word equal to one when the trigger is squeezed to fire a simulated bullet; this task.

TRFLG1—a discreet word set equal to one when the trigger is squeezed to fire a simulated bullet; and BSC—counter utilized to indicate when to initiate a new bullet.

The tables in FIG. 7 store data concerning and describing the condition of each simulated bullet. In this example, each table has ten entries and, thus, the system is capable of simultaneously displaying ten simulated bullets in the form of ten pairs of bullet trajectory indicia, i.e., ten pairs of pips The information stored in the tables comprises:

T(K)—the current time of flight for a simulated bullet;
  DRANG—the range vector for a simulated bullet;
  DVBV—Incremental bullet velocity along the v axis;
  DVBV1—DVBV from previous iteration;
  DVBW—Incremental bullet velocity along the w axis;
  RVDOT—axis range rate of the bullet;
  RVDOT1—RVDOT from previous iteration;
  RWDOT—w axis range rate of the bullet;
  RWDOT1—RWDOT from previous iteration;
  AB—the current acceleration of the bullet;
  VB—the current velocity of the bullet;
  DVB—Bullet speed minus aircraft speed;
  VBW—w axis bullet velocity;
  RVV—v axis bullet range;
  RVV1—RVV from previous iteration;
  RWW—W axis bullet range;

The quantities RVV, RVV1, and RWW are both double precision, meaning that two words of storage are provided for each of these quantities.

Referring now to FIG. 6a, the operation of the firing evaluation and display system is initiated by setting the A register and the B register to PG35. K is set to one and KBUT is set to NBUT. The next step is to fetch T(K) which in this instance would be T(1). This quantity is checked for zero and, if it is zero, then that entry in the bullet table is not active and no update of a bullet position is required for that entry. In such case, KBUT is decremented by one and checked to see if it is zero. If KBUT is zero then all the entries in the bullet table have been processed and processing continues to update any remaining display angular coordinates.

If, however, the content of T(K) is not equal to zero, indicating that this entry in the bullet table reflects an active simulated bullet, then the quantity T(K) is set to the quantity T(K)−1. The time of flight is computed as TFF=(ITMAX−T(K)*0.02. The quantity 0.02 is chosen because the system is set to display 1-10 bullets simultaneously. Presently, with ten bullets a twenty millisecond interrupt time is the minimum and, thus, the quantity ITMAX−T(K) specifies the number of iterations performed and the quantity 0.02 corresponds to the time between iterations.

After computing the time of flight, TFF, the new bullet position for bullet K is calculated according to the foregoing equations and the results are stored in the Kth entry of the bullet tables shown in FIG. 7. Next, the pointer into the number of bullets processed, KBUT, is decremented by one and checked to see if it is zero. If it is not, the A register is incremented by one, the B register is incremented by two and K is incremented by one. The next entry in the bullet table is processed in the above-described manner and the same procedures are iteratively performed until all entries in the bullet table have been accessed and new bullet positions calculated and stored for each active entry.

Once this has been accomplished, the A register and B register are reset to PG35, the C register is set to DEND, K is reset to one and KBUT is set to NBUT. The processing continues to update the angular coordinates for each bullet trajectory indicia or pair of bullet pips stored in the bullet display table of FIG. 8.

This is accomplished by first fetching the first entry in the bullet table T(K) [K=1 in this instance]. If T(K) is equal to zero, then this bullet entry in the bullet table is inactive and no further processing is required. Thus, the computer operation passes to BIPAS and preparations are made to examine the next entry in the bullet table. If, however, the T(K) entry is not equal to zero than DRANG for that bullet entry in the bullet table is checked against the minimum display range DMIN. If DRANG is less than DMIN, then further processing for that entry in the bullet table is bypassed. If not, the x and y positions for each pip of a pair of pips representing the simulated bullet is compared to maximum display parameters to insure that the computer 30 does not generate angular display coordinates which are outside of the display range of display unit 24. If such is the case, further processing for that entry in the bullet table is bypassed. If, however, the x and y coordinates are within the display limits, the angular display coordinates stored in the display table shown in FIG. 8 cooresponding to this bullet position in the bullet table of FIG. 7 are updated with the newly calculated bullet position for that particular bullet entry.

The display table of FIG. 8 utilizes six words of storage for each bullet. These six words store, in order, POSX, POSY, corresponding to $\lambda_v$ and $\lambda_{w1}$, respectively. A JM5 instruction meaning to jump five words ahead in processing, POSX, POSY, corresponding to $\lambda_v$ and $\lambda_{w2}$, respectively, and another JM5 instruction.

The bullet display table shown in FIG. 8 reflects two active bullet positions, i.e., bullet 1 and bullet 2 and eight inactive bullet positions 3–10. In an inactive bullet position, the first word of storage is a JMP6 instruction which results in bypassing all processing for that entry in the bullet display table.

Once the entry in the bullet display table has been updated with new angular coordinates reflecting the newly determined bullet position, the entry T(K) is checked to see if it is equal to one. If it is, that entry in the bullet table is made inactive by setting T(K) equal to zero. This is done because the time of flight for the simulated bullet corresponding to that entry in a bullet table is equal to the maximum time of flight within the system and, thus, the pair of pips for that particular bullet entry will not longer be displayed.

As can be seen from FIG. 6a, the operations following (1) the BIPAS determination, (2) a determination that T(K) is equal to one, and (3) the setting of T(K) to zero are all the same. These operations include incrementing the A register by one, incrementing the B register by two, incrementing the C register by six, incrementing K by one and decrementing KBUT by one. If KBUT is not equal to zero then the next entry in the bullet table is processed in the foregoing manner in order to update its corresponding entry in the bullet display table.

If all entries in the bullet table have been processed, i.e., KBUT equals zero, then the END routine is loaded in the display table and the symbol generator is permitted to transfer the angular coordinates of each pair of pips to the display unit for display on sighting panel 22. The manner in which the display of the pips is accomplished in response to the angular display coordinates is well-known and need not be further discussed.

The processing operations set forth in FIG. 6b are performed in response to the firing of another simulated bullet by the gun operator or pilot. First the trigger flag, TRFLG is checked to see if it equals one. If it does not, then no new simulated bullet has been fired and processing returns to the bullet table updating routines set forth in FIG. 6a. If TRAG is equal to one then another trigger flag TRFLG1 is also checked to see if it equals one. If it does, the bullet counter BSC is decremented by one and checked to see if it equals zero. If it is not equal to zero then a sufficient time has not passed since the previous bullet has been entered into the system and processing returns to the bullet position update routines in FIG. 6a.

If, however, BSC is equal to zero, then BSC is reset, i.e., set to six in this instance, and a new entry is placed in the bullet tables shown in FIG. 7.

The reason that a new bullet entry may not be placed in the bullet table immediately upon the depression of the trigger by the gun operator, is that the system is set up to accommodate a finite number of bullets, in this case ten, and due to the speed of processing by the CPU, the continuous depression of the trigger could overflow the number of entries in the bullet table very rapidly. Since the system is adapted to display ten bullets for a maximum time period of one second, then a new bullet is entered into the system at tenth second intervals.

The entry of a new, simulated bullet into the system is accomplished by scanning the bullet table for zero entries in the T(K) positions. If a zero entry is found, ITMAX is loaded into the T(K) storage position for the detected position in the bullet table. Also, initialization of certain variables is performed at this time, and the instantaneous values of the air data sensors and inertial data sensors are stored in appropriate form in that entry of the bullet table. After these initialization steps are performed, processing returns to the bullet updating routines of FIG. 6a.

In operation, a pilot setting at B (FIG. 3) sights a target aircraft in his field of view 11. The pilot operates the trigger subsystem by actuating the aircraft selector and the trigger for the guns of the aircraft. The aircraft selector generates an aircraft selector pulse AS identifying the type of target aircraft and the trigger subsystem generates trigger pulses T for each depression or the continual depression of the trigger. These signals are provided to the analog-to-digital converter 32.

Meanwhile, the air data generator 34 is supplying instantaneous values for the velocity of the aircraft, $V_a$, the gun angle of attack, $\alpha_g$, and relative air density $\rho$. These signals are similarly encoded by the analog-to-digital converter 32. The inertial data generator 36 is also supplying instantaneous values for the aircraft lift acceleration $A_w$, roll rate p, pitch rate q, and yaw rate r. Again, these signals are encoded by the analog-to-digital converter 32 and, with the other inputs, are supplied to computer 30.

The computer 30 creates an entry in a bullet table stored in its memory for each simulated bullet fired by the pilot. All necessary information for computing and displaying the trajectory of the simulated bullet is stored in its corresponding entry in the bullet table. From this data, the computer computes a range vector and velocity vector for each simulated bullet. Angular display coordinates are generated from the range vector and velocity vector such that a pair of bullet trajectory indicia or visible pips can be displayed in a manner that represents the trajectory of the simulated bullet over a particular time span. The equations necessary for computing the range vector and velocity vector as well as the angular display coordinates have been previously set forth.

The angular display coordinates for the pips are stored in the bullet display table. Periodically, the computer transfers the contents of the bullet display table to the symbol generator 28 which controls the display unit 24 in a manner that will project the bullet trajectory indicia or pips corresponding to each simulated bullet on combining glass 22. This superimposes the pips on the field of view of the pilot so that the relative position of the pips and the target aircraft can be observed. Optionally, a camera 72 is coupled to the display unit 24 by control lines 74 such that the camera can record on videotape the superimposed image of the pips and target much as they are actually seen by the pilot.

The computer continually updates the trajectory for each pair of display pips so that the pips are made to appear to approach the target much as actual bullets would approach the target. This is accomplished by decreasing the distance between the pair of pips while continually updating the display position of the pips. The initial separation between the pips is computed by computer 30 in accordance with the target identification signal AS generated by the trigger subsystem. This separation is a function of some dimension of the identified target, for example, aircraft wingspan. The convergence of the pips is computed to represent the apparent decrease in the selected dimension of the target with increasing distance.

A hit of the target aircraft by the simulated bullet occurs when the pips are seen to be superimposed upon the target and separated from each other by the same distance as the selected dimension of the target. Again, as an example, if the selected dimension is the wingspan of an aircraft then the separation between the pips would have to be equal to the wingspan of the target aircraft as it appears to the pilot when the pips are directly superimposed on the target. This corresponds to the intersection of the plane of the target by the pips representing the simulated bullet.

As an alternate embodiment, a radar unit 31 can be employed to supply the actual range to the target, $R_t$, by radar lock-on. Given this actual target range, the computer can be programmed to compute the point in time that the simulated bullet would arrive at that range. When this occurs, the computer generates a dispersion pattern or other type of visible signal indicating that the pips have arrived at the range of the target. If the pips are directly superimposed over the target at the time of the visible signal, then it can be assumed that a bullet simulated by the pips would have hit the target aircraft. The video camera 72 records the image of the target, the continually changing position of the pips and also the visible signal generated when the pips reach the target range.

It will be understood that the use of the videotape with or without radar lock-on enables the evaluation of the firing technique and accuracy of the pilot. It enables pilots to study gunnery techniques while using actual aircraft as targets in simulated combat situations but avoids the previously mentioned drawbacks of using drones and towed targets.

It will be apparent, to those skilled in the art, that modifications and variations can be made in the exemplary system and method disclosed herein without departing from the scope or spirit of the invention. For example, a system or method wherein more than ten bullets could be simultaneously displayed may be employed. Also, more than two pips could be used to represent each simulated bullet. Thus, it is intended that the present invention cover these modifications and variations of this invention which come within the scope of the appended claims and their equivalents.

What is claimed is:

1. A gunnery simulating system for use with an aircraft during gunfire training and accuracy evaluation, comprising:
    a sighting panel presenting a field of view, including a target, to a gun operator;
    means for generating data signals describing the motion of said aircraft;
    display means for presenting and for displaying simulated bullet indicia on said sighting panel superimposed on said field of view, each said bullet indicium including a pair of bullet trajectory indicia;
    means controlled by said operator for simulating the firing of the guns of the aircraft at said target; and
    means for controlling the operation of said display means to present said simulated bullet indicia responsive to said simulated firing of the guns of the aircraft and to display simulated trajectory paths for each of said presented simulated bullet indicia in said field of view in response to said data signals whereby the display of said simulated trajectory paths of said simulated bullet indicia correspond to the actual trajectory paths which would be followed by real bullets fired from the guns of said aircraft at said target.

2. The system of claim 1 wherein said generating means generates data signals describing the roll rate p, pitch rate q, yaw rate r, lift acceleration $A_w$, true air speed $V_a$, gun angle of attack $\alpha_g$, and relative air density $\rho/\rho_o$.

3. The system of claim 2 wherein each said simulated bullet indicium comprises a pair of bullet trajectory indicia generated by said controlling means and associated with a said simulated trajectory path, said controlling means controlling said display means to display said pair of bullet trajectory indicia equidistantly spaced from said simulated trajectory path and separated from each other by a distance representing a selected dimension of said target.

4. The system of claim 3 wherein said controlling means controls said display means to display said pair of bullet trajectory indicia such that the distance separating said indicia in each said pair of bullet trajectory indicia decreases as each said pair of bullet trajectory indicia is displayed at increasing ranges from said aircraft along said trajectory path whereby said operator is able to determine, by comparing the distance between each said pair of bullet trajectory indicia with said selected dimension of said target image, the point in time and space wherein each said pair of bullet trajectory indicia passes through the spatial plane of said target.

5. The system of claim 4, wherein said controlling means controls said display means to present and to display a plurality of pairs of bullet trajectory indicia simultaneously.

6. The system of claim 5, wherein said controlling means comprises:
    means for generating display symbols for controlling said display means; and
    means for calculating display coordinates $\lambda_v$, $\lambda_{w1}$ and $\lambda_{w2}$ supplying said calculated display coordinates to said symbol generator means to control the display of said pair of bullet trajectory indicia, said coordinates calculated in accordance with the equations:

$$\lambda_v = -\tan^{-1}\left[\frac{R_{b_w} + G_w + Z_p - R_{a_w}}{R_{ab_u}}\right]$$

$$\lambda_{w1} = \tan^{-1}\left[\frac{R_{b_v} + G_v - R_{a_v} + W/2}{R_{ab_u}}\right]$$

$$\lambda_{w2} = \tan^{-1}\left[\frac{R_{b_v} + G_v - R_{a_v} - W/2}{R_{ab_u}}\right]$$

where
$\lambda_v$ = the elevation component of the sight angle of the simulated bullet corresponding to a displayed pair of bullet trajectory indicia;
$\lambda_{w1}$ = the traverse component of the sight angle for one of the indicia of the pair of bullet trajectory indicia corresponding to a simulated bullet;
$\lambda_{w2}$ = the traverse component of the sight angle for the other indicia of the pair of bullet trajectory indicia corresponding to a simulated bullet;
W = the selected dimension of the target;
$Z_p$ = the gun-to-sight parallax correction factor $0 \leq Z_p \leq 20$ feet;
$R_{b_w}$ = the $\overline{w}$ component of the range of the target from the bullet;
$R_{a_w}$ = the $\overline{w}$ component of the range of the target from the aircraft;
$R_{ab}$ = the $\overline{u}$ component of the range of the bullet from the aircraft;
$G_w$ = the $\overline{w}$ component of the force of gravity;
$R_{b_v}$ = the $\overline{v}$ component of the range of the target from the bullet;
$G_v$ = the $\overline{v}$ component of the force of gravity; and
$R_{a_v}$ = the $\overline{v}$ component of the range of the target from the aircraft.

7. The system of claim 6 further including means for video recording the said displayed pair of bullet trajectory indicia as said controlling means controls said display means to display said simulated trajectory path for each said pair of bullet trajectory indicia.

8. A gunnery simulating system for use with an aircraft during gunfire training and accuracy evaluation, comprising:
a sighting panel presenting a field of view, including a target, to a gun operator;
means for generating data signals describing the motion of said aircraft;
display means for presenting and for displaying simulated bullet indicia, each said bullet indicium including a pair of bullet trajectory indicia;
means controlled by said operator for simulating the firing of the guns of the aircraft at said target; and
means for controlling the operation of said display means to present said simulated bullet indicia responsive to said simulated firing of the guns of the aircraft and for displaying simulated trajectory paths for each of said presented simulated bullet indicia in said field of view in response to said data signals whereby the display of said simulated trajectory paths of said simulated bullet indicia correspond to the actual trajectory paths which would be followed by real bullets fired from the guns of said aircraft at said target.

9. A method of practicing gunnery with an aircraft by firing simulated bullets at real targets comprising the steps of:
initiating a simulated bullet each time the trigger of an aircraft is activted by a gun operator;
supplying data signals reflecting the instantaneous motion of said aircraft;
generating a pair of bullet trajectory indicia associated with each said initiated simulated bullet;
simulating the trajectory path of a real bullet fired from guns of said aircraft by generating a simulated trajectory path for each said pair of bullet trajectory indicia from the values of the said data signals supplied at the time said associated simulated bullet was initiated and from the elapsed time since the said associated simulated bullet was initiated; and
displaying said pair of bullet trajectory indicia as said pair of inidica traverse said simulated trajectory path.

10. A method of practicing gunnery with an aircraft by firing simulated bullets at real targets comprising the steps of:
initiating a simulated bullet each time the trigger of an aircraft is activated by a gun operator;
supplying data signals reflecting the instantaneous motion of said aircraft;
generating a pair of bullet trajectory indicia associated with each said initiated simulated bullet;
simulating the trajectory path of a real bullet fired from guns of said aircraft by generating a simulated trajectory path for each said pair of bullet trajectory indicia from the values of the said data signals supplied at the time said associated simulated bullet was initiated and from the elapsed time since the said associated simulated bullet was initiated; and
displaying on a head-up display unit visible to said gun operator said pair of bullet trajectory indicia as said pair of indicia traverse said simulated trajectory path.

11. The method of either claim 9 or 10 wherein said step of simulating further includes spacing said indicia in said pair of bullet trajectory indicia equidistantly about said simulated trajectory path and decreasing the separation between said indicia in said pair of bullet trajectory indicia as the range of said pair of bullet trajectory indicia increases from said aircraft along said simulated trajectory path.

12. The method set forth in claim 11 wherein said step of displaying further includes superimposing said pair of bullet trajectory indicia traversing said simulated trajectory path on said real target.

13. The method set forth in claim 12 wherein said step of simulating further includes selecting a spacing between a said pair of bullet trajectory indicia that is a function of a dimension of said target.

14. The method set forth in claim 13 wherein said step of simulating further includes iteratively calculating the coordinates of said bullet trajectory indicia along said simulated trajectory path and controlling the display of said pair of bullet trajectory indicia to reflect said iteratively calculated coordinates.

15. The method set forth in claim 14 wherein said step of calculated further includes computing $$\lambda_v = -\tan^{-1}\left[\frac{R_{bw} + G_w + Z_p - R_{aw}}{R_{ab_u}}\right]$$

$$\lambda_{w1} = \tan^{-1}\left[\frac{R_{bv} + G_v - R_{av} + W/2}{R_{ab_u}}\right]$$

$$\lambda_{w2} = \tan^{-1}\left[\frac{R_{bv} + G_v - R_{av} - W/2}{R_{ab_u}}\right]$$

where
$\lambda_v$ = the elevation component of the sight angle of the simulated bullet corresponding to a display pair of bullet trajectory indicia;
$\lambda_{w1}$ = the traverse component of the sight angle for one of the indicia of the pair of bullet trajectory indicia corresponding to a simulated bullet;
$\lambda_{w2}$ = the traverse component of the sight angle for the other indicia of the pair of bullet trajectory indicia corresponding to a simulated bullet;
W = the selected dimension of the target;
$Z_p$ = the gun-to-sight parallax correction factor, $0 \leq Z_p \leq 20$ feet;
$R_{bw}$ = the $\overline{w}$ component of the range of the target from the bullet;
$R_{aw}$ = the $\overline{w}$ component of the range of target from the aircraft;
$R_{ab}$ = the $\overline{u}$ component of the range of the bullet from the aircraft;
$G_w$ = the $\overline{w}$ component of the force of gravity;
$R_{vv}$ = the $\overline{v}$ component of the range of the target from the bullet;
$G_v$ = the $\overline{v}$ component of the force of gravity;
$R_{av}$ = the $\overline{v}$ component of the range of the target from the aircraft.

16. The method of claim 14 further including the step of video recording each said displayed pair of bullet trajectory indicia traversing a said simulated trajectory path.

17. A method for practicing gunnery with an aircraft by firing simulated bullets at a real target comprising the steps of:
initiating a simulated bullet each time the trigger of the aircraft is activated by a gun operator;

supplying the values of data signals reflecting the instantaneous motion of said aircraft;

simulating the trajectory path of a real bullet fired at said target by said aircraft by:

(1) generating a simulated bullet trajectory path for a said simulated bullet, said simulated bullet trajectory path reflecting the values of data signals supplied at the time said simulated bullet was initiated;

(2) generating a pair of bullet trajectory indicia for said initiated simulated bullet;

(3) displaying said pair of bullet trajectory indicia said displayed indicia being equidistantly spaced from the simulated bullet trajectory path and separated from each other by a distance related to a dimension of said target; and (4) controlling the displaying of said pair of bullet trajectory indicia such that said pair of bullet trajectory indicia visually appear to traverse said simulated bullet trajectory path toward said target as if a said real bullet were traveling from said aircraft toward said target.

18. The method set forth in claim 17 wherein said step of controlling further includes decreasing the spacing between said indicia in said pair of bullet trajectory indicia in a proportional manner to increasing distance of said pair of bullet trajectory indicia along said simulated bullet trajectory path away from said aircraft.

19. The method set forth in claim 18 further including the step of determining the actual distance of said target from said aircraft when a simulated bullet is initiated and wherein said controlling step further includes displaying an indication of when the distance of said bullet trajectory indicia along said simulated bullet trajectory path equals said actually determined distance of said target.

* * * * *